(12) United States Patent
Ayana et al.

(10) Patent No.: US 8,729,869 B2
(45) Date of Patent: May 20, 2014

(54) SHORE POWER TRANSFER SWITCH

(71) Applicant: Cummins Power Generation IP, Inc., Indianapolis, IN (US)

(72) Inventors: Elias Ayana, St. Paul, MN (US); Mitchell E. Peterson, Maple Grove, MN (US); Alyssa Marlenee, Minneapolis, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 0 days.

(21) Appl. No.: 13/967,021

(22) Filed: Aug. 14, 2013

(65) Prior Publication Data

US 2013/0328389 A1  Dec. 12, 2013

Related U.S. Application Data

(62) Division of application No. 13/337,756, filed on Dec. 27, 2011, now Pat. No. 8,513,925, which is a division of application No. 12/006,075, filed on Dec. 28, 2007, now Pat. No. 8,085,002.

(60) Provisional application No. 60/877,746, filed on Dec. 29, 2006.

(51) Int. Cl.
*H02K 7/18* (2006.01)
*H02P 9/00* (2006.01)

(52) U.S. Cl.
USPC ............................................. 322/44; 290/1 A (58) Field of Classification Search
USPC ........ 322/12, 44, 89, 20, 17; 290/1 A, 40 R, 8
See application file for complete search history.

(56) References Cited

U.S. PATENT DOCUMENTS

| | | | |
|---|---|---|---|
| 3,571,693 A * | 3/1971 | Riaz | 322/32 |
| 4,182,960 A * | 1/1980 | Reuyl | 290/1 R |
| 4,961,403 A * | 10/1990 | Kawaguchi et al. | 123/2 |
| 6,965,818 B2 * | 11/2005 | Koenig et al. | 701/36 |
| 7,982,331 B2 | 7/2011 | Murray et al. | |
| 2004/0036295 A1 * | 2/2004 | Nakagawa et al. | 290/31 |
| 2004/0084965 A1 * | 5/2004 | Welches et al. | 307/64 |
| 2005/0052027 A1 * | 3/2005 | Priem | 290/1 A |
| 2006/0005736 A1 * | 1/2006 | Kumar | 105/1.4 |

* cited by examiner

*Primary Examiner* — Julio Gonzalez Ramirez
(74) *Attorney, Agent, or Firm* — Foley & Lardner LLP (57) ABSTRACT

A vehicle includes a mobile electric power generation system including a mobile power source such as a generator. An external power interface is included to connect to an external electrical power source. An AC electric power distribution bus is included to power electric loads of the vehicle and a power switch device is provided to selectively provide AC electric power on the power distribution bus from one of the respective power sources with a default to select one of the sources whenever it is present.

8 Claims, 5 Drawing Sheets

SHORE POWER TRANSFER SWITCH

CROSS-REFERENCE TO RELATED APPLICATIONS

The present application is a divisional of U.S. patent application Ser. No. 13/337,756 filed on 27 Dec. 2011, which is a divisional of U.S. patent application Ser. No. 12/006,075 filed on 28 Dec. 2007, which claims the benefit of U.S. Provisional Patent Application No. 60/877,746 filed on 29 Dec. 2006, each of which is hereby incorporated by reference in its entirety.

BACKGROUND

The present invention relates to electrical power systems, and more particularly, but not exclusively, relates to switching between different electrical power sources.

Recreational vehicles, such as mobile homes, houseboats, yachts, and so forth, are becoming increasingly popular items. These vehicles, as well as other types of vehicles, often include a generator that supplies power throughout the vehicle while the vehicle is in a stationary or parked state. The generator typically provides electricity to run air conditioners, heaters, lights, refrigerators, televisions, and so forth. Generators come in a variety of sizes that are capable of handling a variety of different load values.

It is not always desirable to utilize the generator if an external power source is available (sometimes called "shore power"). As a result, some vehicle power systems include an interface to "plug in" to shore power. Concomitantly, a power switch selects between the generator and external shore power sources. Because of the power levels involved, orderly and fail-safe control of such switches is often of interest. Indeed, there is an ongoing demand for further contributions in this area of technology.

SUMMARY

One embodiment of the present invention includes a unique technique involving electric power switching. Other embodiments include unique methods, devices, systems, and apparatus involving electric power systems. Further embodiments, forms, features, aspects, benefits, and advantages of the present application shall become apparent from the description and figures provided herewith.

DETAILED DESCRIPTION OF REPRESENTATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
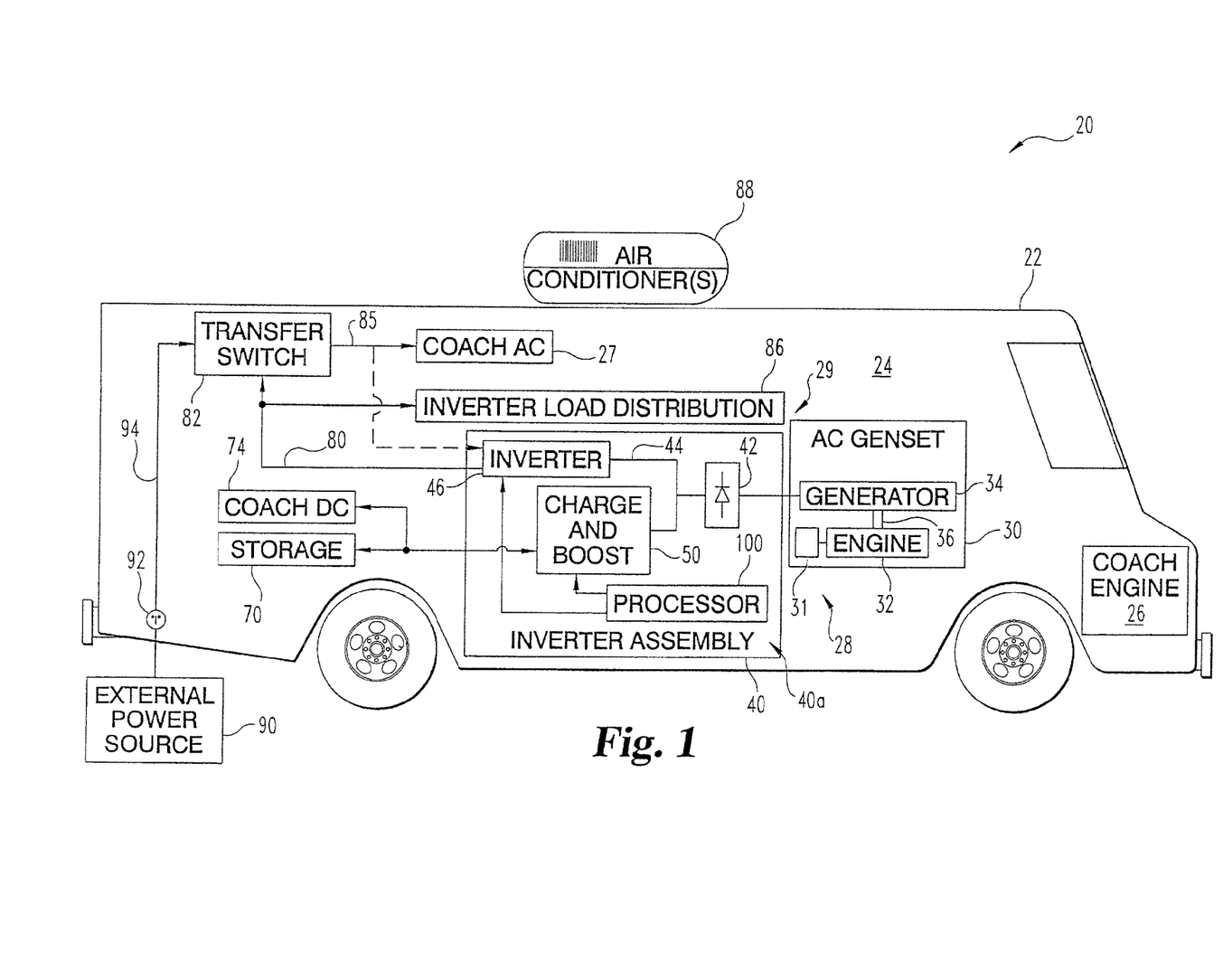
FIG. 1 is a diagrammatic view of a vehicle carrying an electric power generation system.

FIG. 1 illustrates vehicle 20 in the form of a motor coach 22. Motor coach 22 includes interior living space 24 and is propelled by coach engine 26. Coach engine 26 is typically of a reciprocating piston, internal combustion type. To complement living space 24, coach 26 carries various types of AC electrical loads 27, such as one or more air conditioner(s) 88. Electrical loads 27 may further include lighting, kitchen appliances, entertainment devices, and/or such different devices as would occur to those skilled in the art. Coach 22 carries mobile electric power generation system 28 to selectively provide electricity to equipment 27. Correspondingly, electrical loads 27 electrically load system 28. In one form, various components of system 28 are distributed throughout vehicle 20—being installed in various bays and/or other dedicated spaces.

System 28 includes a mobile power source 29. Mobile power source 29 includes Alternating Current ("AC") power from genset 30 and Direct Current ("DC") power from electrical energy storage device 70. Genset 30 includes a dedicated engine 32 and three-phase AC generator 34. Engine 32 provides rotational mechanical power to generator 34 with rotary drive member 36. In one arrangement, engine 32 is of a reciprocating piston type that directly drives generator 34, and generator 34 is of a permanent magnet alternator (PMA) type mounted to member 36, with member 36 being in the form of a drive shaft of engine 32. In other forms, generator 34 can be mechanically coupled to engine 32 by a mechanical linkage that provides a desired turn ratio, a torque converter, a transmission, and/or a different form of rotary linking mechanism as would occur to those skilled in the art. Operation of engine 32 is regulated through an Engine Control Module ("ECM") 31 that is in turn responsive to control signals from control and inverter assembly 40 of system 28.

The rotational operating speed of engine 32, and correspondingly rotational speed of generator 34 varies over a selected operating range in response to changes in electrical loading of system 28. Over this range, genset rotational speed increases to meet larger power demands concomitant with an increasing electrical load on system 28. Genset 30 has a steady state minimum speed at the lower extreme of this speed range corresponding to low power output and a steady state maximum speed at the upper extreme of this speed range corresponding to high power output. As the speed of genset 30 varies, its three-phase electrical output varies in terms of AC frequency and voltage.

Genset 30 is electrically coupled to assembly 40. Assembly 40 includes power control circuitry 40a to manage the electrical power generated and stored with system 28. Circuitry 40a includes three-phase rectifier 42, variable voltage DC power bus 44, DC-to-AC power inverter 46, charge and boost circuitry 50, and processor 100. Assembly 40 is coupled to storage device 70 to selectively charge it in certain operating modes and supply electrical energy from it in other operating modes via circuitry 50 as further described hereinafter. Assembly 40 provides DC electric power to the storage device 70 and one or more motor coach DC loads 74 with circuitry 50 and provides regulated AC electric power with inverter 46. Equipment 27 is supplied with AC power via inverter AC output bus 80. Bus 80 is coupled to AC power transfer switch 82 of system 28. One or more electrical loads 84 are supplied AC power via switch 82 by an AC power distribution bus 85. System 28 also provides inverter load distribution 86 from bus 80 without switch 82 intervening therebetween.

As shown in FIG. 1, switch 82 is electrically coupled to external AC electrical power source 90 (shore power) through external power interface 92 and shore power bus 94. Hereinafter, AC electrical power supplied by source 90 is referred to as "shore power". It should be appreciated that shore power generally cannot be used when vehicle 20 is in motion, may not be available in some locations; and even if available, shore power is typically limited by a circuit breaker or fuse. When power from source 90 is applied, genset 30 is usually not active. Transfer switch 82 routes the shore power to electrical loads 27. With the supply of external AC power from source 90, assembly 40 can be arranged to function as one of electrical loads 27, converting the AC shore power to a form suitable to charge storage device 70. This arrangement is represented by the dashed-line connection of bus 85 to inverter 46 as a selective input when relying on shore power. Likewise, inverter load distribution 86 can be arranged to receive shore power from source 90 when power is not available from genset 30.

Assembly 40 further includes processor 100. Processor 100 executes operating logic that defines various control, management, and/or regulation functions. This operating logic may be in the form of dedicated hardware, such as a hardwired state machine, programming instructions, and/or a different form as would occur to those skilled in the art. Processor 100 may be provided as a single component, or a collection of operatively coupled components; and may be comprised of digital circuitry, analog circuitry, or a hybrid combination of both of these types. When of a multi-component form, processor 100 may have one or more components remotely located relative to the others. Processor 100 can include multiple processing units arranged to operate independently, in a pipeline processing arrangement, in a parallel processing arrangement, and/or such different arrangement as would occur to those skilled in the art. In one embodiment, processor 100 is a programmable microprocessor of a solid-state, integrated circuit type that includes one or more processing units and memory. Processor 100 can include one or more signal conditioners, modulators, demodulators, Arithmetic Logic Units ("ALUs"), Central Processing Units ("CPUs"), limiters, oscillators, control clocks, amplifiers, signal conditioners, filters, format converters, communication ports, clamps, delay devices, memory devices, and/or different circuitry or functional components as would occur to those skilled in the art to perform the desired communications. In one form, processor 100 includes a computer network interface to facilitate communications using industry standard Controller Area Network ("CAN") communications among various system components and/or components not included in the depicted system, as desired.

Figure 2:
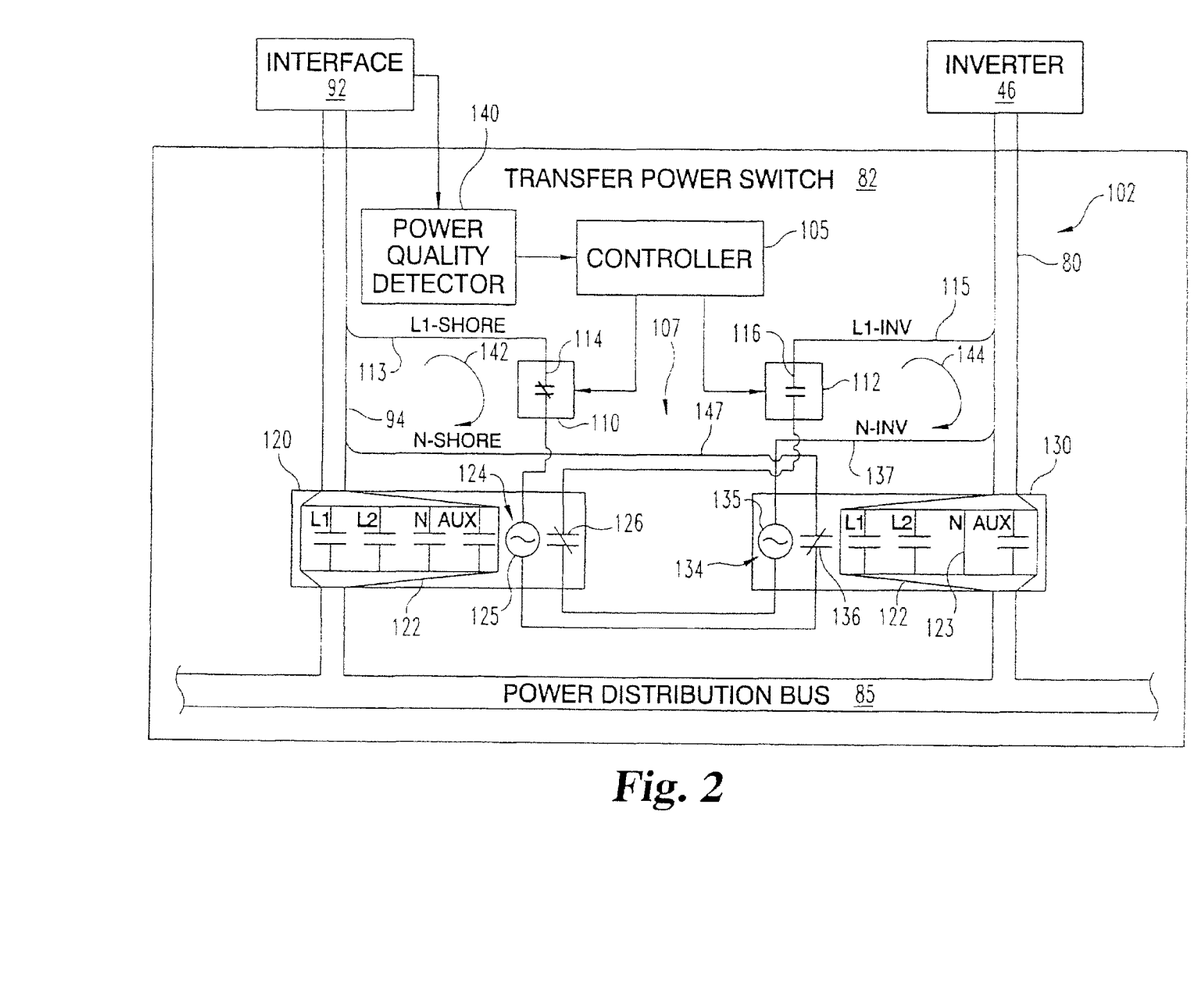
FIG. 2 is a schematic view of transfer switch circuitry of the system of FIG. 1.

FIG. 2 further illustrates selected aspects of the transfer switch 82. Transfer switch 82 is electrically connected with system 28 via bus 80, power distribution bus 85, and source 90 via interface 92. Transfer switch 82 is also electrically connected with inverter load distribution 86. As set forth above, power distribution bus 85 is used to provide AC power to electrical loads 27 of coach 22. Transfer switch 82 is used to selectively and controllably supply AC power to electrical loads 27 by switching between shore power provided by source 90 or mobile power provided by system 28. Transfer switch 82 switches between source 90 and system 28 in a manner that protects electrical loads 27 of coach 22.

Transfer switch 82 includes switching logic 102 that includes a controller 105 that directs certain aspects of switching operation. Controller 105 may physically reside as one or more components in the assembly for transfer switch 82, or at least partially reside in physical form in one or more other assemblies of system 20 that sends corresponding control signals to transfer switch 82. To the extent controller 105 is located in another assembly, its representation in FIG. 2 is of a logical variety. In one particular form, at least a portion of the operation of controller 105 is defined by processor 100 of assembly 40 with signals being provided to transfer switch 82 via a CAN bus interface (not shown). Nonetheless, in other arrangements, controller 105 may be self-contained in transfer switch 82. In any event, control 105 may be configured in the various ways described in connection with processor 100 to the extent it is a separate device.

Logic 102 also includes controllable relay 110, controllable relay 112, shore power contactor device 120, and inverter power contactor device 130. Controller 105 is operatively connected to controllable relay 110 and a controllable relay 112 to provide corresponding control signals thereto. A shore power line ("L1-SHORE") 113 of shore power bus 94 is connected with normally closed (NC) contacts 114 of relay 110. The output of NC contacts 114 is provided as a control input to a shore (external) power contactor device 120. Contactor device 120 includes a state control 124. State control 124 is in the form of a magnetic coil 125 that mechanically opens and closes normally open (NO) contacts 122 (more specifically designated as contacts of Line 1 (L1), Line 2 (L2), Neutral (N), and Auxiliary (AUX)), and normally closed (NC) contacts 126 of shore contactor device 120. In lieu of or in addition to coil 125, any of a number of other types of control devices effective to change the state of NO contacts 122 and NC contacts 126 can be utilized.

Shore contactor device 120 includes a plurality of normally open power bus contacts 122 that are controllably operable by contactor state control 124 to either allow or disallow power to be transferred from source 90 to electrical loads 27 over power distribution bus 85 through transfer switch 82. As set forth in greater detail below, when shore power is connected to interface 92, L1-SHORE on shore power line 113 of shore power bus 94 is connected as a control input to NC contacts 114 of relay 110. Accordingly, L1-SHORE is routed to energize contactor state control 124 to close NO contacts 122 and open NC contacts 126. As a result, bus 94 is connected to power bus 85 to provide external electric power to electrical loads 27.

An inverter power line ("L1-INV") 115 is connected as an input to normally open (NO) contacts 116 of relay 112. As set forth above, relay 112 is also connected with and selectively controlled by controller 105. Relay contacts 116 have an output connected with an input of normally closed (NC) contacts 126 of device 120, which in turn, has an output connected as a control input to inverter contactor state control 134. The output of inverter contactor state control 134 is connected with a neutral power line ("N-INV") 137 of inverter bus 80. Control 134 is in the form of an electromagnetic coil 135, but can vary as in the case of control 124.

Inverter contactor device 130 also includes a plurality of NO power bus contacts 122 that are responsive to inverter contactor state control 134 to either allow or disallow power to be transferred from system 28 via inverter 46 to electrical loads 27 over power distribution bus 85 through transfer switch 82. When it is desired to source power from inverter bus 80, contacts 116 of relay 112 are closed, which causes inverter contactor state control 134 to close NO contacts 122, connecting bus 80 to bus 85 to source electric power for electrical loads 27 from inverter 46. Device 130 also includes NC contacts 136 that are electrically connected in series with shore power state control 124 and the neutral path of bus 94 ("N-SHORE"). Transfer switch 82 also includes a neutral power line ("N") 123 of bus 80 that always is connected regardless of the state of control 134 to reduce the required current rating of contactor device 130. The neutral power line N is schematically represented by an "always closed" logical connection through contactor device 130.

The connection of bus 80 to bus 85 via contactor device 130 only occurs under conditions that prevent bus 94 from being coupled to bus 85 at the same time, as further described hereinafter. As illustrated in FIG. 2, external power control circuit 142 connects NC contacts 114 of relay 110, shore contactor control 124, and normally closed contacts 136 of inverter contactor device 130 in series to provide a conditional L1-SHORE to N-SHORE electrically conductive loop. Circuit 142 is closed when: (a) shore power (L1-SHORE) is available, (b) NC contacts 114 are closed, and (c) NC contacts 136 are closed. Mobile/generated power control circuit 144 connects NO contacts 116 of relay 112, NC contacts 126 of shore contactor device 120, and inverter contactor state control 134 in series to provide a conditional L1-INV to N-INV electrically conductive loop. Circuit 144 is closed when: (a) power from inverter (L1-INV) is available, (b) NO contacts 116 are closed, and (c) NC contacts 126 are closed.

If control 124 is energized through circuit 142, NO contacts 122 of contactor device 120 are closed and NC contacts 126 of contactor device 120 are open. The opening of contacts 126 prevents current flow through control 134, which prevents a change in state of the NO contacts 122 and NC contacts 136 of contactor device 130. Considering the default NC and NO states of relays 110 and 112, respectively, if shore power is available, then circuit 142 is closed and power to bus 85 is sourced from interface 92. The corresponding contacts 126 change from normally closed to open, which prevents circuit 144 from closing while circuit 142 remains closed and shore power is available—even if power from inverter 46 is also available. If shore power is not available, but power from inverter 46 is available and the state of relay 112 is changed from normally open to closed, then circuit 144 is completed. The corresponding contacts 136 change from normally closed to open, which prevents circuit 142 from closing while circuit 144 remains closed and power from inverter 46 remains available. Further operational aspects are described in connection with FIG. 3 after the description of further aspects of FIG. 2, as follows.

A power quality detector or circuit 140 is included in transfer switch 82, that may be defined at least in part by operating logic of controller 105; however, in other implementations some or all of its operation can be remote to transfer switch 82. For example, it may be at least partially defined by operating logic executed by processor 100. Power quality detector 140 monitors the quality of the shore power, such as its voltage level, AC frequency, the integrity of the shore ground connection (N-SHORE), or the like. If the quality of the shore power falls below a predetermined level, the transfer switch 82 may switch power from shore power to mobile power supplied by system 28 via inverter 46. The shore power may be determined to be unacceptable if power quality detector 140 determines that a loss of ground has occurred and/or an overvoltage, undervoltage, and/or frequency deviation (just to name a few examples)-exceeds a predefined threshold in terms of magnitude or time. In response to unacceptable shore power quality, controller 105 activates relay 110 to open NC contacts 114 and activates relay 112 to close NO contacts 116. As a result, circuit 142 opens and circuit 144 closes, and if power from inverter 46 is available, it can be provided in lieu of shore power.

Switching logic 102 of transfer switch 82 safeguards against the inadvertent supply of shore power and mobile (inverter) power to power distribution bus 85 at the same time. In addition, transfer switch 82 provides a fail-safe such that if shore power is lost or falls below a predetermined quality value, it is capable of automatically switching to mobile power provided by system 28. Also, even though the shore contactor has normally open contacts 122, if inverter 46 fails and shore is available, fail-safe to shore power is achieved through normally closed contacts 114 and 136. If power is present from source 90 and system 28 at the same time and controller 105 opens normally open contact 116 of NO relay 112, normally open contactors 122 of inverter contactor device 130 will still remain open to prevent mobile power from reaching bus 85 because contacts 126 of shore contactor device 120 are open. Correspondingly, mobile power reaches distribution bus 85 only if mobile power is present and controller 105 activates both relays 110 and 112, which would deactivate control 124 of contactor device 120.

Figure 3:
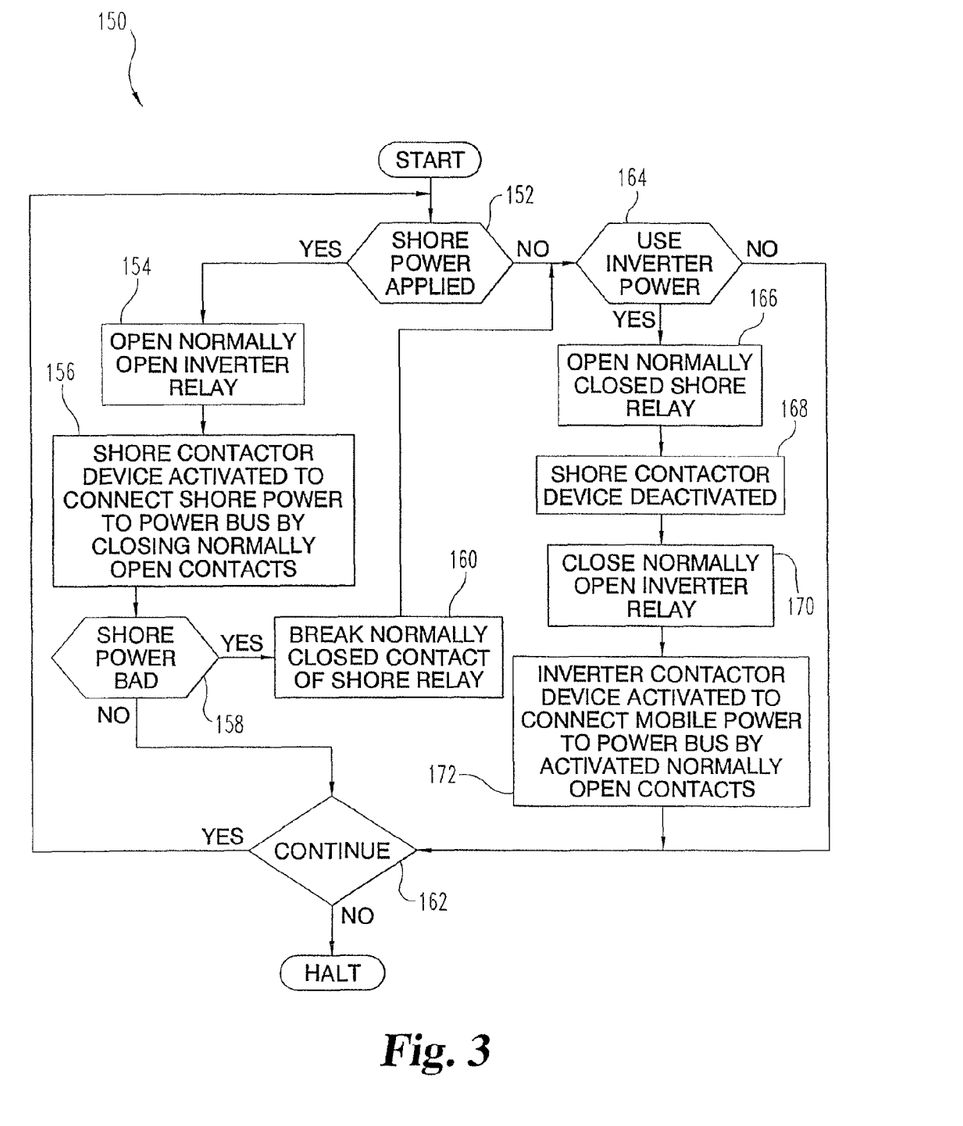
FIG. 3 is a flowchart of operating logic according to one process that can be implemented with the circuitry of FIG. 2.

Accordingly, logic 102 is structured so that transfer switch 82 defaults to the use of shore power when available even if mobile power from inverter 46 is also available. FIG. 3 depicts one possible control process for switch 82 in flowchart form as routine 150. Logic 102 may be configured to perform routine 150 in whole or in part; however, in other embodiments, operation may differ with logic 102 configured correspondingly (including without limitation the embodiments described in connection with FIGS. 4 and 5). Further, it should be appreciated that in other embodiments, various operations, tests, and conditionals of routine 140 may be performed in a different order, may be performed in parallel, may be absent, and/or may be duplicated in such manner as would occur to those skilled in the art.

Routine 150 begins with conditional 152. In conditional 152, controller 105 makes a determination as to whether or not shore power is applied or present. Power quality detector 140 may be used to determine if shore power is present. It should be appreciated that conditional 152 may declare that shore power is unavailable if shore power quality is unacceptable. If shore power is present, at operation 154, controller 105 may open contact 116 of NO relay 112 if it is not already in an open state. Assuming contact 114 of NC relay 110 is in a closed state and shore power is present, shore contactor device 120 becomes activated to connect shore power bus 94 to power distribution bus 85 by closing normally open contacts 122 of shore contactor device 120, which is represented in operation 156. As such, electrical power, in the form of shore power, is provided through transfer switch 82 to electrical loads 27 of coach 22. If contact 114 of NC relay 110 is not in a closed state, controller 105 will place contact 114 of NC relay 110 in a closed state.

As set forth above, because shore contactor device 120 is activated when shore power is present and contact 114 of NC relay 110 is in a closed state, normally closed contact 126 of shore contactor device 120 will be in an open state. As such, inverter contactor device 130 maintains normally open contacts 122 in an open state, and mobile power is not capable of being supplied to power distribution bus 85. In addition, contact 116 of NO relay 112 may be placed in a closed state by controller 105 even if shore power is present, but mobile power will still not be provided to the power distribution bus 85. This result follows because normally closed contact 126 of shore contactor device 120 is in an open state due to the presence of shore power, which will not allow inverter contactor device 130 to activate and close its respective normally open contacts 122 to connect mobile power to power distribution bus 85. Accordingly, contacts 116 of NO relay 112 are closed by controller 105 when shore power is no longer available and mobile power exists. In other implementations, when both shore power and mobile power are available, mobile power is favored by logic 102.

In conditional 158, a determination is made as to whether or not shore power being supplied by source 90 is of a high enough quality to be used in coach 22. As previously set forth, the power quality detector 140 determines whether shore power quality is acceptable. If the shore power does not meet acceptable quality standards, in operation 160, controller 105 will send a signal to NC relay 110 causing it to open contact 114. Opening contact 114 will cause shore contactor state control 124 to open normally open contacts 122 and disconnect shore power from power distribution bus 85. Normally closed contact 126 then returns to its normally closed state. If shore power quality is acceptable, a determination is made whether or not it is necessary to continue to provide either shore power or mobile power. If a requirement for either shore power or mobile power still exists, conditional 162 will return to conditional 152. If a requirement for either shore power or mobile power no longer exists, controller 105 takes appropriate action to cease supplying shore or mobile power to power distribution bus 85 and routine 150 halts.

If shore power is not applied as tested by conditional 152 or its quality is unacceptable as tested by conditional 158, a determination is made whether to use mobile power supplied from system 28 via bus 80 in conditional 164. Alternatively, any time mobile power is available it may be utilized even if shore power of acceptable quality is also available. If so, routine 150 proceeds to operation 166. In operation 166, controller 105 confirms/sets normally closed contacts 114 of NC relay 110 to an open state to ensure that nor rally closed contacts 126 of shore contactor device 120 remain closed and circuit 142 remains open. By opening contacts 114, shore power is prevented from reaching bus 85.

In operation 170, controller 105 sends a signal to normally open contacts 116 of NO relay 112 causing normally open contacts 116 to be set to a closed state. As a result of normally open contacts 116 being set in a closed state, a signal is sent through normally closed contacts 126 of shore contactor device 120 to inverter contactor state control 134 of inverter contactor device 130. In response to this signal, inverter contactor state control 134 closes normally open contacts 122 of inverter contactor device 130 to connect bus 80 to bus 85 so that mobile power from system 28 is supplied to power distribution bus 85 for use by electrical loads 27 of coach 22.

Referring back to FIG. 2, if both NC relay 110 and NO relay 112 are closed, and both shore and mobile power are available, the power routed to bus 85 comes from the source that first reached its respective contractor control 124 or 134 to close its respective circuit 142 or 144, because the first to reach it would cause the other circuit 142 or 144 to be opened by virtue of the opening of the NC contacts 126 or 136 of whichever contactor control 124 or 134 is activated first.

Figure 4:
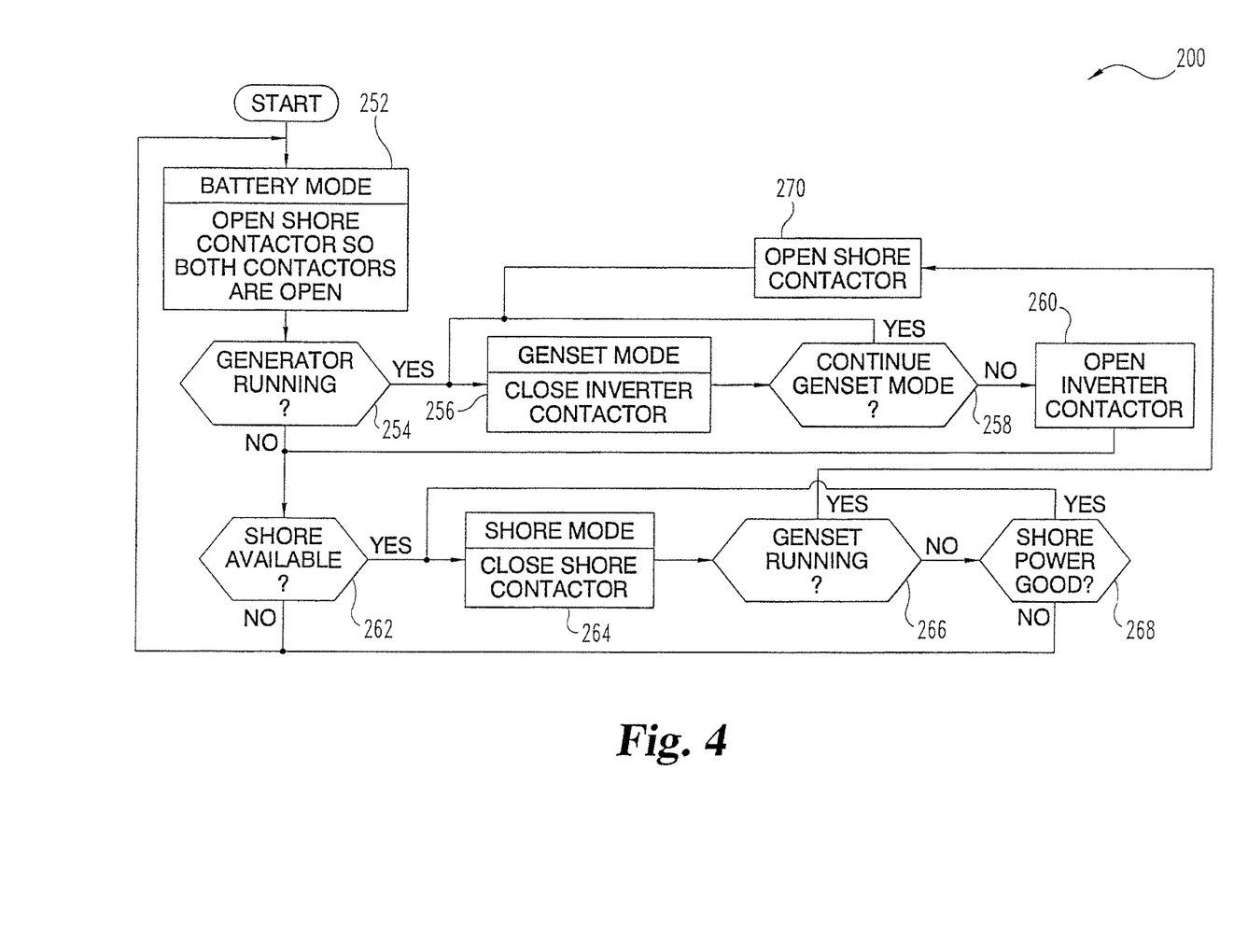
FIG. 4 is a flowchart corresponding to operating logic of an alternative process that can be implemented with the equipment of FIGS. 1 and 2.
Figure 5:
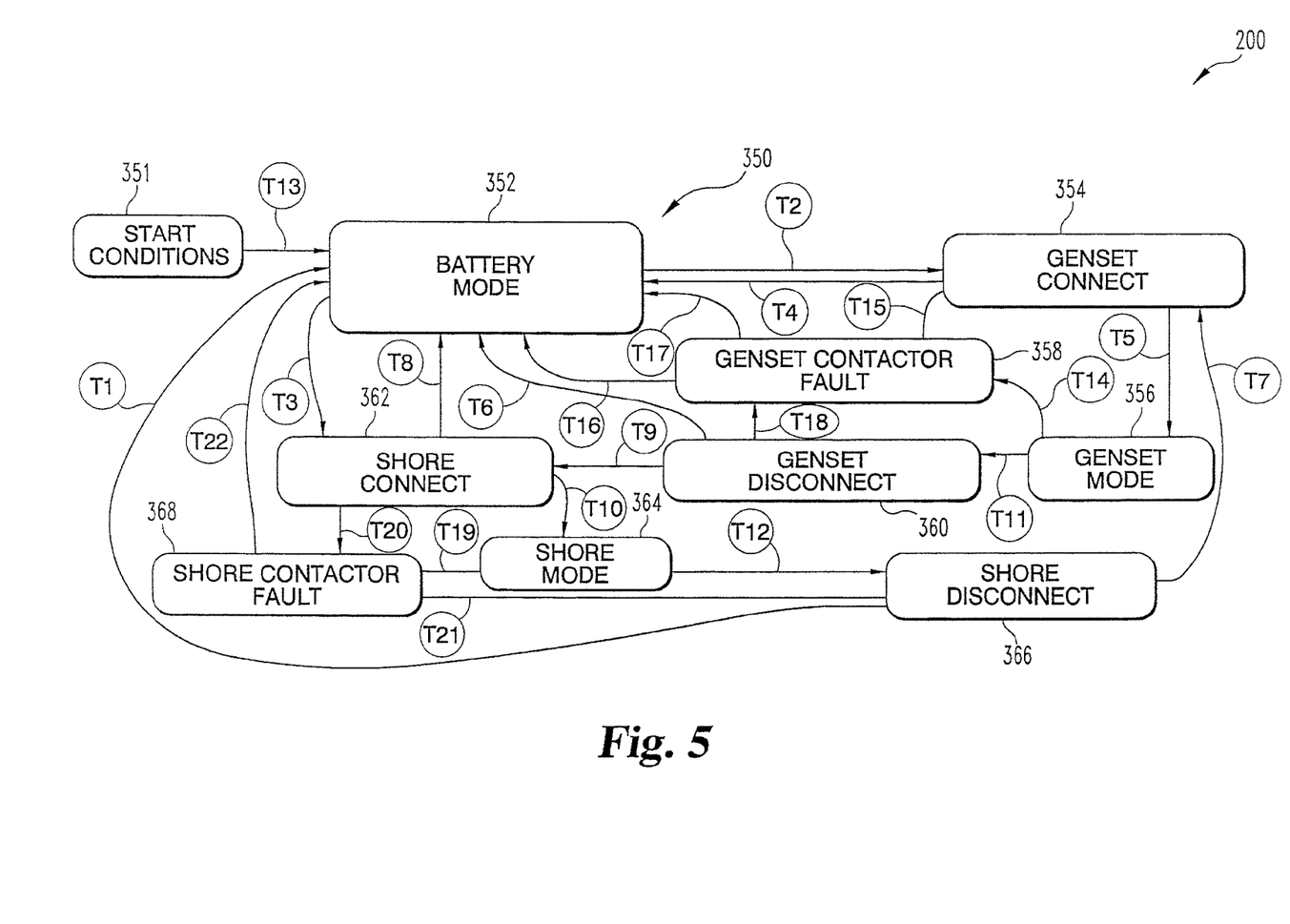
FIG. 5 is a state logic diagram corresponding to the flowchart of FIG. 4.

FIGS. 4 and 5 represent an alternative form of operating logic 200 that can be implemented with the equipment depicted in FIGS. 1 and 2. Like routine 150, implementation of operating logic 200 can be based on software, firmware, hardwired logic, or a combination of these—to name just a few examples. FIG. 4 is a flowchart representation of operating logic 200 and FIG. 5 is a corresponding state diagram. FIGS. 4 and 5 depict different models of logic 200 and to the extent they differ in terms of substance, they reflect different logic 200 details, variations, features, or the like, such that both depictions should be taken together to represent logic 200. FIG. 4 starts with a battery mode of operation 252 in which power is supplied to bus 85 from storage device 70 of system 28. The corresponding battery mode state 352 is shown in FIG. 5. In operation 252 (and state 352), both contactors 120 and 130 are open such that power is not being sourced through transfer switch 82. As further illustrated in FIG. 5, at startup, state 352 is approached from a startup state 351. In state 351, a startup timer is enabled and shore contactor device 120 is commanded to its NO condition. The transition from state 351 to state 352 occurs when logic variable T13 is true. The logic expression for T13 is: {(StartupReady==1) && (ShorePositionStatus==Open)}

Accordingly, a startup flag is set (startupready==1) and contactor device 120 is open (disconnected from bus 85) as a predicate to transitioning from state 351 to state 352. State 252 also sets to "off" a general contactor operation delay parameter, a genset contactor fault delay parameter for contactor device 130, and a shore contactor fault delay parameter for contactor device 120.

Operation 252 of FIG. 4 proceeds to conditional 254. Conditional 254 tests whether genset 30 is running. If it is, conditional 254 proceeds to a genset operating mode in operation 256. Genset mode state 356 of FIG. 5 corresponds to operation 256. In FIG. 5, the transition to state 356 from state 352 includes an intervening genset connect state 354. Besides state 356, state 354 alternatively returns to state 352 or to genset contactor fault state 358. In state 354, the general contactor operation delay parameter is set to "on" and contactor device 130 is commanded to the closed position. State 354 is reached from state 352 when logic variable T2 is true. The logic expression for T2 is: {((Power UnitReadyToLoad==Ready) && (ShorePosition Status==Open) && (InverterReadyToLoad==PUReady))}, such that genset 30 is ready for electrical loading, the shore contactor device 130 is open, and inverter 46 is ready for loading by genset 30; where "PowerUnit" is generally an alternative designation for genset 30. Accordingly, genset 30 is ready to support the electrical load, inverter 46 is ready for loading by genset 30, and contactor device 120 is in an open condition for the change from state 352 to state 354.

To move from state 354 to state 356 (genset mode of operation), logic variable T5 is true, which is represented by the logic expression: {(PowerUnitPositionStatus==Closed) && (PowerUnitReadyToLoad==Ready) && (InverterReadyToLoad==PUReady)}; where PUReady is a power ready flag corresponding to readiness of inverter 46. Accordingly, this change of state occurs when the contactor device 130 is closed and flags for both the genset 30 and its inverter 46 indicate readiness. In state 356, the genset 30 (and inverter 46) are connected and the general contactor delay is set to "off." States can also change from state 354 (genset connect) to state 352 (battery mode), if state logic variable T4 is true. The logic expression for variable T4 is: {(PowerUnitReadyToLoad==NotReady||InverterReadyToLoad!=PUReady)}, such that genset 30 is not ready or inverter 46 is not ready for genset loading.

From operation 256 of FIG. 4, logic 200 proceeds with conditional 258 that tests if genset 30 is still running and/or whether to continue the genset mode of operation 256. If it is, then there is a return to operation 256 and this loop between operation 256 and conditional 258 repeats until the test of conditional 258 is negative (genset mode is discontinued). From the negative branch of conditional 258, operation 260 is reached. In operation 260, contactor device 130 is opened.

Referring to FIG. 5, the corresponding state logic performance involves genset contactor fault state 358 and genset disconnect state 360, as well as several logic variables. State 358 is reached from state 356 when there is a fault detected in relation to contactor device 130, such that state logic variable T14 is true. The logic expression for variable T14 is: {PowerUnitPositionStatus==Open) && (PowerUnitReadyToLoad==Ready) && (InverterReadyToLoad==PUReady)}. As a result, contactor device 130 for genset 30 remains Open—disconnected from bus 85 (PowerUnitPositionStatus==Open)—even when inverter 46 and genset 30 are otherwise ready to be loaded due to the detected fault. In state 358, disconnection of genset 30 (power unit) is commanded and a corresponding fault flag is set. State 358 can also be reached directly from state 354 when state logic variable T15 is true. Variable T15 is based on the expression: {(ContactorOperationDelayTimeout==1)}, such that the contactor operation time delay, corresponding to the general contactor delay parameter, has lapsed or timed-out. In other words, a maximum time delay before connecting the genset in state 354 with contactor device 130 has been exceeded resulting in a timeout and fault as reflected in state 358. It should further be appreciated that state 358 can be reached from state 360 if state logic variable T18 is true. Variable T18 is based on the expression: {(ContactorOperationDelayTimeout)==1)}, such that the contactor operation time delay has lapsed or timed-out as described in connection with variable T15.

In turn, a transition from state 358 (genset contactor fault) back to state 352 (battery mode) occurs when state logic variable T16 is true, which is based on the logic expression: {(PUContactorFaultTimeout==1) && (PowerUnitReadyToLoad==Ready) && (PowerUnitPositionStatus==Open)}, such that contactor device 130 has had a fault timeout, genset 30 is ready for loading, and the contactor device 120 is open. Also, the transition form state 358 to state 352 occurs when state logic variable T17 is true. Variable T17 is based on the logic expression: {(PowerUnitReadyToLoad==NotReady) && (PowerUnitPositionStatus==Open)}, such that genset 30 is not ready for electrical loading and contactor device 130 is open.

In genset disconnect state 360, contactor device 130 is commanded open (disconnected), and the general contactor delay parameter is set to "on." Genset operating mode state 356 transitions to genset disconnect state 360 based on state logic variable T11, the logic expression for which is: {(PowerUnitReadyToLoad==NotReady)|| (InverterReadyToLoad!=PUReady)}. Accordingly, this transition occurs when genset 30 or inverter 46 are not ready for electrical loading. Transition from state 360 to state 352 also occurs when state logic variable T6 is true. Variable T6 is based on the logic expression: {(PowerUnitPositionStatus==Open) && (ShoreAvailable==NotAvailable), such that contactor device 130 is open and shore power is not available.

Returning to FIG. 4, logic 200 continues from operation 260 to conditional 262, which tests whether shore power is available. Conditional 262 is also reached directly from conditional 254 when its test is negative. If the test of conditional 262 is affirmative (shore power is available), a shore operating mode in operation 264 is reached. In operation 264, contactor device 120 is closed to connect shore power from interface 92 to bus 85. In FIG. 5, shore mode state 364 corresponds to operation 264. State 364 includes setting the general contactor delay parameter to "off." State 364 is reached from shore contactor connect state 362, which is in turn reached from state 352 or state 360. The transition from state 352 to state 362 occurs when state logic variable T3 is true based on the logic expression: {((PowerUnitReadyToLoad==NotReady && InverterReadyToLoad==ShoreReady) && (ShoreAvailable==Available) && (PowerUnitPositionStatus==Open))}, such that genset 30 is not ready for loading, inverter 46 is ready to receive shore power to charge storage device 70, shore power is otherwise available, and contactor device 130 is open. The transition from state 360 to state 362 occurs when state logic variable T9 is true based on the expression: {((PowerUnitPositionStatus==Open) && (ShoreAvailable==Available) && (InverterReadyToLoad==ShoreReady))}, such that contactor device 130 is open, shore power is otherwise available, and inverter 46 is ready for charging storage device 70 with shore power. It should be appreciated that transition to state 362 from genset disconnect state 360 occurs only after genset operation in genset mode state 356.

In shore connect state 362, the connection of shore power from interface 92 to bus 85 via contactor 120 is commanded and the general contactor delay parameter is set to "on." The transition from shore connect state 362 to the shore mode state 364 occurs when state logic variable T20 is true, which is represented by the logic expression: {((ShorePositionStatus==Closed) && (ShoreAvailable==Available) && (InverterReadyToLoad==ShoreReady))}, such that contactor device 120 is closed, shore power is otherwise available, and inverter 46 is ready to charge device 70 from shore power. A transition from state 362 to state 352 occurs when state logic variable T8 is true. Variable T8 is based on the logic expression: {((InverterReadyToLoad!=ShoreReady)|| (ShoreAvailable==NotAvailable))}, such that inverter 46 is not ready for shore mode operation or shore power is not otherwise available. Also, it should be appreciated that a transition from state 362 to state 364 occurs when state logic variable T10 is true. Variable T10 is based on the logic expression: {((ShorePositionStatus==Closed) && (ShoreAvailable==Available) && (InverterReadyToLoad=ShoreReady))}, such that shore contactor 120 is closed, shore power is otherwise available, and inverter 46 is ready for shore mode operation.

Returning to FIG. 4, shore mode operation 264 proceeds to conditional 266 to determine if genset 30 is running. If this test is negative, logic 200 continues with conditional 268 to ascertain whether the shore power is of acceptable quality, that is the shore power is "good." If the test of conditional 268 is affirmative, logic 200 returns to operation 264 to execute in shore mode and repeats until the test of conditional 266 is true (genset running) or the test of conditional 268 is negative (shore power is not good). If the test of conditional 266 is true, logic 200 proceeds to operation 270 in which the shore contactor device 120 is opened to break the connection between shore power and bus 85. Operation 270 proceeds to operation 256 to return to the genset operating mode previously described. Also previously described, the negative branch of conditional 266 reaches conditional 268, and the affirmative branch of conditional 268 reaches operation 264 to repeat. If the test of conditional 268 is negative, logic 200 returns to the battery mode in operation 252 to start again.

Somewhat analogous, FIG. 5 includes shore disconnect state 366 and shore contactor fault state 368. Shore disconnect state 366 commands disconnection of contactor device 120 such that shore power is no longer provided to bus 85 and sets the general contactor delay parameter to "on." State 366 transitions to one of three other states depending on which state logic variable is true: T1, T7, or T21. Variable T1 is based on the logic expression: {((ShorePosition Status==Open) && (PowerUnitReadyToLoad==NotReady))}, such that contactor device 120 is open and the genset 30 is not ready to accept electrical loading. When true, variable T1 changes state from state 366 (shore disconnect) to state 352 (battery mode). Variable T7 is based on the logic expression: {(ShorePositionStatus==Open) && (PowerUnitReadyToLoad==Ready) && (InverterReadyToLoad==PUReady)}, such that contactor device 120 is open, genset 30 is ready to accept electrical loading, and inverter 46 is ready to accept electrical loading. When true, variable T7 transitions state from state 366 (shore disconnect) to state 355 (genset connect). Variable T21 is based on the logic expression: {(ContactorOperationDelayTimeout==1)}, such that contactor operation has timed out relative to the delay parameter, indicating a fault of contactor device 120. As a result, when variable T7 is true, logic transitions from state 366 (shore disconnect) to state 368 (shore contactor fault). State 266 is reached from state 364 when state logic variable T12 is true. Variable T12 is based on the logic expression: {((PowerUnitReadyToLoad==Ready)|| (ShoreAvailable==NotAvailable)|| (InverterReadyToLoad!=ShoreReady))}, such that genset 30 is ready to accept electrical loading, or shore is not available (due to absence of it or poor shore power quality, for instance) or inverter 46 is not ready for the shore power mode.

Shore contactor fault state 368 commands the disconnection of shore contactor device 120 between shore power and bus 85, and sets a fault indicator "on." When state logic variable T22 is true, state changes from state 368 (shore contactor fault) to state 352 (battery mode). Variable T22 is based on the logic expression: {(ShorePositionStatus==Open) && (ShoreContactorFaultTimeout==1)}, such that shore contactor device 120 is open and a shore contactor fault timeout is true. It should be appreciated that state 368 can also be reached from state 362 (shore connect) when state logic variable T20 is true or from state 364 (shore mode) when state logic variable T19 is true. Variable T19 is based on the logic expression: {((ShorePositionStatus==Open) && (InverterReadyToLoad==ShoreReady) && (PowerUnitReadyToLoad==NotReady))}, such that shore contactor device 120 is open, inverter 46 is ready for shore mode (i.e. charging storage device 70), and genset 30 is not ready for loading. Variable T20 is based on the logic expression: {(ContactorOperationDelayTimeout==1)}, such that operation of the contactor has taken too long, resulting in a timeout.

Based on any of these operational approaches, a further embodiment of the present invention includes: providing a mobile electric power generation system with an external power interface, a variable speed generator, and control logic, coupling the interface to a source external to the electric power supply system when the electric power supply system is stationary, monitoring the electricity received from the source external to the system to detect if the electricity has one or more unacceptable properties with the control logic, and in response to detection of one or more unacceptable properties, the control logic switching to receive electric power from the variable speed generator.

Another embodiment of the present application includes a mobile electric power generation system including a mobile power source with a variable speed generator, an external power interface to connect to an external electrical power source when the electric power generation system is stationary, an AC electric power distribution bus, and a power switch device to selectively provide AC electric power on the power distribution bus from one of the power source and the external power interface. The power switch includes a first normally open contactor between the external power interface and the power distribution bus, a normally closed switch, a first normally closed contactor, and a first contactor state control. The power switch further includes a second normally open contactor between the mobile power source and the power distribution bus, a normally open switch, a second normally closed contactor, and a second contactor state control. In addition, the power switch includes control circuitry to selectively switch each of an external power circuit and a mobile power circuit between an opened state and a closed state, the external power circuit connecting the normally closed switch, the first contactor control and the second normally closed contactor in series, the generated power circuit connecting the normally open switch, the second contactor state control and the first normally closed contactor in series.

Yet a further embodiment is directed to an apparatus that includes a local power source including a variable speed generator and an inverter; an external power interface to connect to an external electrical power source; an AC electric power distribution bus; and a power switch device to selectively provide AC electric power on the power distribution bus from one of the power source and the external power interface. The power switch includes a first normally open contactor between the external power interface and the power distribution bus, a first switch, and a first contactor state control; a second normally open contactor between the inverter and the power distribution bus, a second switch, and a second contactor state control. An external power control circuit is further included through the first switch and the first contactor state control, the external power control circuit having a default closed state when external power is available at the external power interface, the default closed state of the external power circuit providing electricity from the external power interface to the first contactor state control to close the first normally open contactor and correspondingly route the AC electric power to the power distribution bus from the external power interface. Further included is a local power control circuit through the second switch and the second contactor state control, the local power control circuit having a default open state when the external power circuit is in the default closed state.

A further embodiment is directed to an apparatus comprising an external power interface to receive electricity from a source external to the electric power supply system when the electric power supply system is stationary, a power generation subsystem including a variable speed generator connected to an inverter, and a power switch device connected to an AC electric power distribution bus, the power switch device including a first normally open contactor connected between the external power interface and the power distribution bus and a second normally open contactor connected between the inverter and the power distribution bus. The apparatus further includes means for operating the electric power supply system with a default condition of at least initially providing external power to the power distribution bus in response to the external power becoming available through the external power interface by closing the first contactor in response to the external power becoming available through the external power interface to route the external power to the power distribution bus and means for maintaining the second contactor in an open contactor state while the first normally open contactor is closed.

Yet another embodiment includes a variable speed generator connected to an inverter; an external power interface to receive electricity from a source external to the electric power supply system when the power supply system is stationary; a power switch device connected to an AC electric power distribution bus, the power switch device including a first normally open contactor connected between the external power interface and the power distribution bus, a second normally open contactor connected between the inverter and the power distribution bus, means for operating the electric power supply system with a default condition of at least initially providing external power to the power distribution bus in response to the external power becoming available through the external power interface, the operating means including means for closing the first normally open contactor in response to the external power becoming available through the external power interface to route the external power to the power distribution bus and means for maintaining the second normally open contactor in an open contactor state while the first normally open contactor is closed.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. An apparatus, comprising: a mobile electric power generation system including a mobile power source with a generator, an external power interface to connect to an external electrical power source when the electric power generation system is stationary, an AC electric power distribution bus, and a power switch device to selectively provide AC electric power on the power distribution bus from one of the power source and the external power interface, the power switch including:

a first normally open contactor between the external power interface and the power distribution bus, a normally closed switch, a first normally closed contactor, and a first contactor state control;

a second normally open contactor between the mobile power source and the power distribution bus, a normally open switch, a second normally closed contactor, and a second contactor state control; and control circuitry to selectively switch each of an external power circuit and a mobile power circuit between an opened state and a closed state, the external power circuit connecting the normally closed switch, the first contactor control and the second normally closed contactor in series, the generated power circuit connecting the normally open switch, the second contactor state control and the first normally closed contactor in series.

2. The apparatus of claim 1, further comprising a vehicle carrying the mobile electric power generation system.

3. The apparatus of claim 2, where the vehicle is a motor coach with one or more air conditioners and the one or more air conditioners provide an electrical load on the power distribution bus.

4. The apparatus of claim 1, wherein the mobile power source includes an inverter electrically connected to the generator by a DC bus and an electrical energy storage device coupled to the DC bus, and the inverter is electrically connected between the DC bus and the second normally open contactor.

5. The apparatus of claim 1, wherein the control circuitry includes a means for detecting poor power quality from the external power interface, and the normally closed switch is responsive to the detecting means to change the normally closed switch to an open state to break the external power circuit.

6. The apparatus of claim 5, wherein the normally open switch is responsive to the control circuitry to change to be closed when the external power control circuit is in the open state and electricity from the mobile power source is available.

7. The apparatus of claim 1, wherein the first contactor state control includes a first electromagnetic coil responsive to the external power circuit, the second contactor state control includes a second electromagnetic coil responsive to the mobile power circuit, the normally closed switch is a first relay mechanism responsive to the control circuitry and the normally open switch is a second relay mechanism responsive to the control circuitry.

8. The apparatus of claim 1, wherein the generator is a variable speed generator connected to an inverter.

* * * * *